United States Patent
Reynolds et al.

(10) Patent No.: US 7,111,810 B2
(45) Date of Patent: Sep. 26, 2006

(54) FORWARD PIVOTED FULL FLYING CONTROL TAIL BOOM

(75) Inventors: Ross Steven Reynolds, La Habra, CA (US); Doug Ellwood Shultz, La Habra, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 369 days.

(21) Appl. No.: 10/774,932

(22) Filed: Feb. 9, 2004

(65) Prior Publication Data

US 2005/0173593 A1    Aug. 11, 2005

(51) Int. Cl.
B64C 5/08    (2006.01)

(52) U.S. Cl. ............... 244/213; 244/215; 244/75 R; 244/82; 244/87; 244/89

(58) Field of Classification Search ........ 244/213–215, 244/75 R, 90 R, 48, 82, 88, 89
See application file for complete search history.

(56) References Cited

U.S. PATENT DOCUMENTS

| | | | |
|---|---|---|---|
| 641,119 A | 1/1900 | Kemper | |
| 1,817,651 A * | 8/1931 | Schroeder | ................... 244/215 |
| 1,875,267 A | 8/1932 | Savoja | |
| 1,929,255 A | 10/1933 | Northrop | |
| 2,049,188 A * | 7/1936 | Alfaro | ......................... 244/211 |
| D103,290 S | 2/1937 | Wendt | |
| 2,120,065 A * | 6/1938 | Rouge | ...................... 244/75 R |
| 2,173,674 A | 9/1939 | Zaparka | |
| 2,257,940 A * | 10/1941 | Dornier | .................... 244/53 R |
| 2,326,819 A | 8/1943 | Berlin | |
| D143,732 S | 2/1946 | Hall et al. | |
| 2,601,962 A * | 7/1952 | Douglas | ..................... 244/201 |
| 3,009,670 A | 11/1961 | Williams et al. | |
| 3,653,611 A | 4/1972 | Trupp et al. | |
| 3,934,843 A | 1/1976 | Black | |
| 4,538,779 A | 9/1985 | Goldstein | |
| 4,598,888 A * | 7/1986 | Beteille | .................... 244/76 R |
| 5,395,073 A | 3/1995 | Rutan et al. | |
| 5,560,568 A | 10/1996 | Schmittle | |
| 5,769,359 A | 6/1998 | Rutan et al. | |
| 5,863,013 A | 1/1999 | Schmittle | |
| 6,224,012 B1 * | 5/2001 | Wooley | ......................... 244/2 |

FOREIGN PATENT DOCUMENTS

WO    WO 9416942 A1    8/1994

* cited by examiner

*Primary Examiner*—Galen Barefoot
(74) *Attorney, Agent, or Firm*—Stetina Brunda Garred & Brucker

(57) ABSTRACT

An aircraft motion control mechanism for regulating aircraft motion from a location remote from an aircraft body portion. The aircraft auxiliary control mechanism has at least one control surface support arm connected to and extending from the aircraft body portion, and an auxiliary flow control surface connected to the support arm. By pivotally controlling the movement of the support arm, the auxiliary flow control surface is operative to deflect airflow to regulate orientation of the aircraft. In addition, the auxiliary flow control surface may further deflect the airflow by deflecting about the support arm.

8 Claims, 4 Drawing Sheets

FORWARD PIVOTED FULL FLYING CONTROL TAIL BOOM

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates generally to an auxiliary or primary control structure, and more particularly to a forward pivoted full flying control tail boom hinged with a fuselage/wing of an aircraft.

Lift is a mechanical force generated by interaction and contact between a solid body and a fluid for holding an aircraft in the air. For an aircraft, the lift is typically generated by the deflecting down the air flow, then the air deflects the airfoil up based on the Newton's Third Law of Motion. In another approach, by producing more movement of the air towards the top surface of a wing, a higher velocity of wind on the top side of the wing and a lower velocity of wind on the underside of the wing are resulted. This normally achieved by configuring the wing with a curved shape. According to Bernoulli's Law, the lower velocity on the underside of the wing creates a higher pressure, and the higher velocity creates a lower pressure to pull the wing up.

The amount of lift generated depends on how much the flow is turned; and therefore, the aft portions of wings of most aircrafts are designed with hinged sections to control and maneuver the aircrafts. FIG. 1 shows a typical airplane 10 including a fuselage 12, a pair of wings 14, and a horizontal fixed stabilizer 16 at the tail of the fuselage 12. Hinged at the leading edge of the wings 14 are a pair of slats 18, and hinged at the trailing edge of the wings 14 are a pair of flaps 20 for generating and adjusting the lift of the airplane 10 and a pair of ailerons 24. The areas of the ailerons 24 are relatively small compared to the flaps 20. In addition to the wings 14, the tail 16 may also control the lift by hinging a pair of elevators 22 at the trailing edge of the stabilizer 16. The major part of the lift comes from the wings 14, but the horizontal stabilizer 16 also produces some lift which can be varied to maneuver the aircraft. By deflecting the flaps 20 and the elevators 22 down, more lift is are generated. On the contrary, if either the flaps 20 or the elevators 22 are deflected up, less lift (or negative lift) is generated. Based on stability concern for the aircraft 10 as shown in FIG. 1, the aerodynamic center is typically located aft of the center of gravity (c.g.). Therefore, when the flaps 20 and/or the elevators 22 are deflected down to increase lift, a counterclockwise rotation about the center of gravity of the airplane 10 is generated. On the contrary, when the flaps 20 and/or the elevators 22 are deflected up to decrease lift, a clockwise rotation about the center gravity of the airplane 10 is created. The pitch motion, that is, the rotation about the center of gravity created by the deflection of the aft section of the wings thus results in an opposite inclination of the intended motion of the airplane, which is further described as follows.

In addition to the shape of the aircraft, the lift also depends on how the aircraft moves through the air, that is, the inclination of the aircraft. The inclination is normally expressed by the angle that the airfoil inclined from the flight direction, which is referred as the angle of attack. The larger the angle of attack is, the more amount of lift is generated. However, when the angle of attack reaches a critical point to generate a turbulent flow that lifting off the boundary layer of air from the surface of the airfoil, the lift is lost, and the aircraft is in a stall condition. The relationship between the inclination of the aircraft, that is, angle of attack, and the lift is as shown in FIG. 2.

For the airplane 10 as shown in FIG. 1, the elevators 22 are often used to control the pitch motion. That is, when more lift is generated by the wings 18, instead of being deflected down to generate more lift, the elevators 22 are deflected up to eliminate the pitch motion. Accordingly, the upward deflection of the elevators 22 negates the lift required for the intended motion of the airplane 10. It is very unlikely that such kind of airplane can attain the maximum lift potential and the trimming condition at the same time.

In addition to the pitch motion generated by the deflection of the flaps 20 and the elevators 22 of the wings 14 and the tails 16, roll motion will be caused by the deflection of the pair of the ailerons 24. The ailerons 24 are normally deflected in pair, with individual ailerons deflected in opposite directions. For example, when one of the ailerons 24 is deflected up to cause one of the wing tips moving down, the other of the ailerons 24 is deflected down to cause the other wing tip moving up. The airplane 10 is thus banked, and the flight path of the airplane 10 is curved. The geometry of the ailerons 24 are normally symmetric to generate a pair of substantially identical forces. However, considering the banking motion of the aircraft 10, the forces generated by the ailerons 24 produces a torque to cause the aircraft to spin about the principle axis of the aircraft 10. The spinning motion about the principal axis of the airplane 10 generates roll motion, which is typically controlled by the ailerons 24 operated to negate the banking motion of the aircraft 10.

On some lately developed aircrafts such as the all-wing aircrafts that require high ratio of lift coefficient to drag coefficient (L/D), tails are often eliminated to minimize drag that resists the motion of the aircrafts. The wings are thus the only structure that can deflect the air flow to generate more lift; and at the same time, the only structure to trim the aircrafts. As is well known to those skilled in aerodynamic design, the lift is determined by a product of a lift coefficient, the density of air, square of velocity, and the area of the wings. The lift coefficient incorporates the dependencies of the shape and the inclination of the aircraft. Therefore, to design a high altitude loitering aircraft, a high cruise lift coefficients (CL) is required for efficiency. As mentioned above, in aircrafts with the maximum ratio of lift to drag such as the all-wing aircrafts, tail area is minimized or even eliminated, the lift coefficient thus solely depends on the shape of the wing and the inclination of the aircraft caused by the deflection of the wing. Therefore, the all-wing aircrafts are further limited in their ability to trim to the higher angles of attack required to achieve their maximum lift coefficients. In other words, the all-wing aircrafts may be unable to efficiently counter the pitching moment while attaining the maximum lift potential.

BRIEF SUMMARY OF THE INVENTION

The present invention provides an aircraft motion control mechanism for regulating aircraft motion from a location remote from an aircraft body portion, allowing the aircraft to attain an enhanced lift coefficient in a trimmed condition. The aircraft motion control mechanism comprises a support arm and an auxiliary or primary flow control surface connected to the support arm. The support arm is connected to and extending from the aircraft body portion. Preferably, the support arm is pivotally connected to the aircraft body portion, such that when the support arm is moved or pivoted about the aircraft body portion, the auxiliary flow control surface connected to the support arm consequently moves to deflects airflow to regulate the orientation of the aircraft.

Preferably, the support arm and the auxiliary/primary flow control surface are made of low reflectivity material transparent for reduced radar return. In addition to, or in lieu of the deflection caused by the movement of the support arm, the auxiliary flow control surface can be designed to deflect about the support arm to obtain deflection of airflow.

The mechanism further comprises a control system for regulating the movement of the support arm and/or the deflection of the auxiliary flow control surface in response to the sensed motion of the aircraft. The sensed motion of the aircraft includes pitch motion and roll motion, for example. For sensing motion of the aircraft, various kinds of motion detectors, such as pitch motion detectors and roll motion detectors may further be installed in the control system, depending on the motion to be controlled.

Alternatively, the control system may also be configured to regulate the movement of the support arm and/or the deflection of the auxiliary flow control surface in response to deflection of the flaps, the ailerons and the elevators of the aircraft.

The aircraft motion control mechanism is particularly suitable for use in a manned or unmanned tailless aircraft or an all-wing aircraft. The aircraft body portion from which the support arm is extending from includes fuselage or wing of the aircraft, depending on type of the aircraft. Further, the part of the aircraft body portion where the support arm is connected may be sealed or covered with a low reflectivity material to reduce radar return.

The present invention further provides an aircraft that incorporates an aircraft motion control mechanism to regulate the motion thereof from a location remote from an aircraft body portion. The aircraft body portion includes a fuselage or a wing. The aircraft motion control mechanism comprises at least one support arm with first end and second end, and at least one auxiliary flow control surface connected to the second end of the support arm.

The first end of the support arm is pivotally connected to the aircraft body portion, such that by the pivoting the support arm, the auxiliary flow control surface is operative to deflect airflow in a given direction, so as to regulate the motion of the aircraft in that axis.

Preferably, the auxiliary flow control surface is deflectable about the support arm. Therefore, without the movement of the support arm, the airflow can also be deflected by the auxiliary flow control surface. A control system functions to regulate movement of the support arm and/or deflection of the auxiliary flow control surface in response to motion of the aircraft, for example, detected pitch motion or roll motion.

Therefore, in addition to the deflectable surfaces such as the flaps, the ailerons and elevators hinged with the body portion of the aircraft, the motion of the aircraft can be regulated by deflecting the auxiliary flow control surface remote from the body portion. When the auxiliary flow control surface remote from the body portion is used to regulate motion of the aircraft, the deflectable surfaces directly hinged with the body portion, i.e., the flaps, the ailerons, and the elevators, can be used solely for adjusting the lift to obtain a high cruise lift coefficient.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
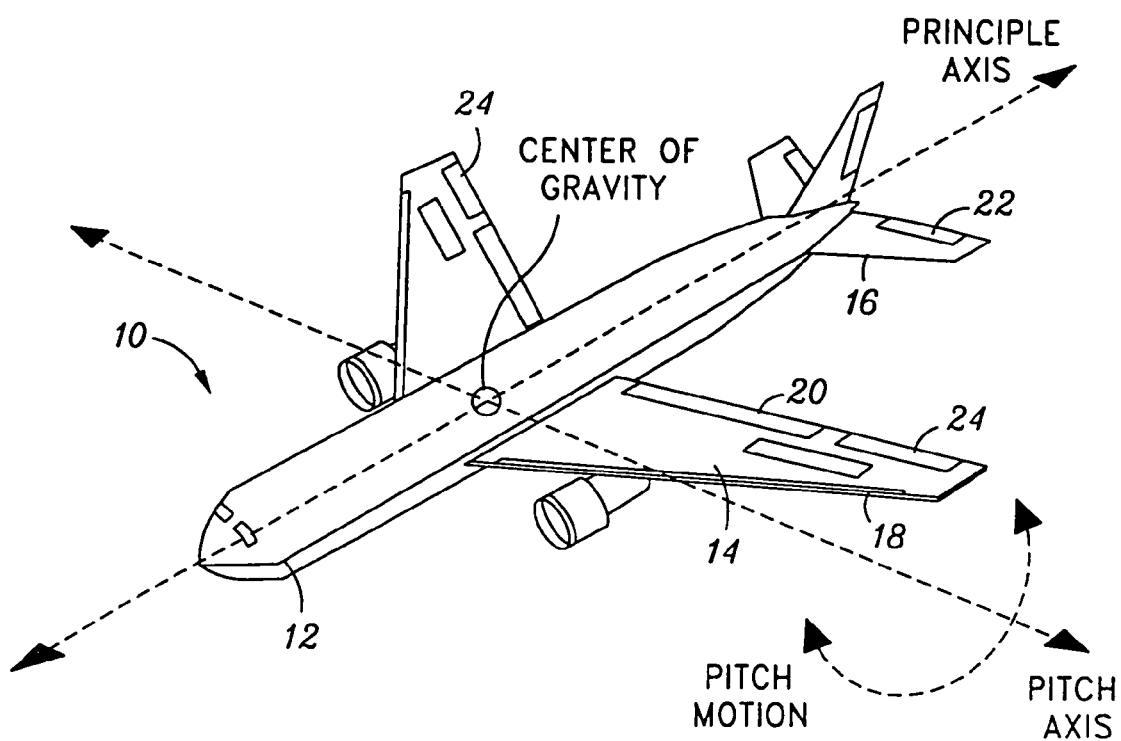
FIG. 1 shows various parts of a typical airplane and the direction of pitch motion of the airplane.
Figure 3:
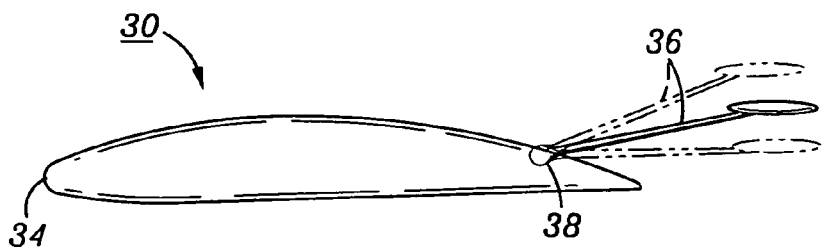
FIG. 3 shows a side view of an all-wing aircraft having a single pivotable control structure according to the present invention.
Figure 4:
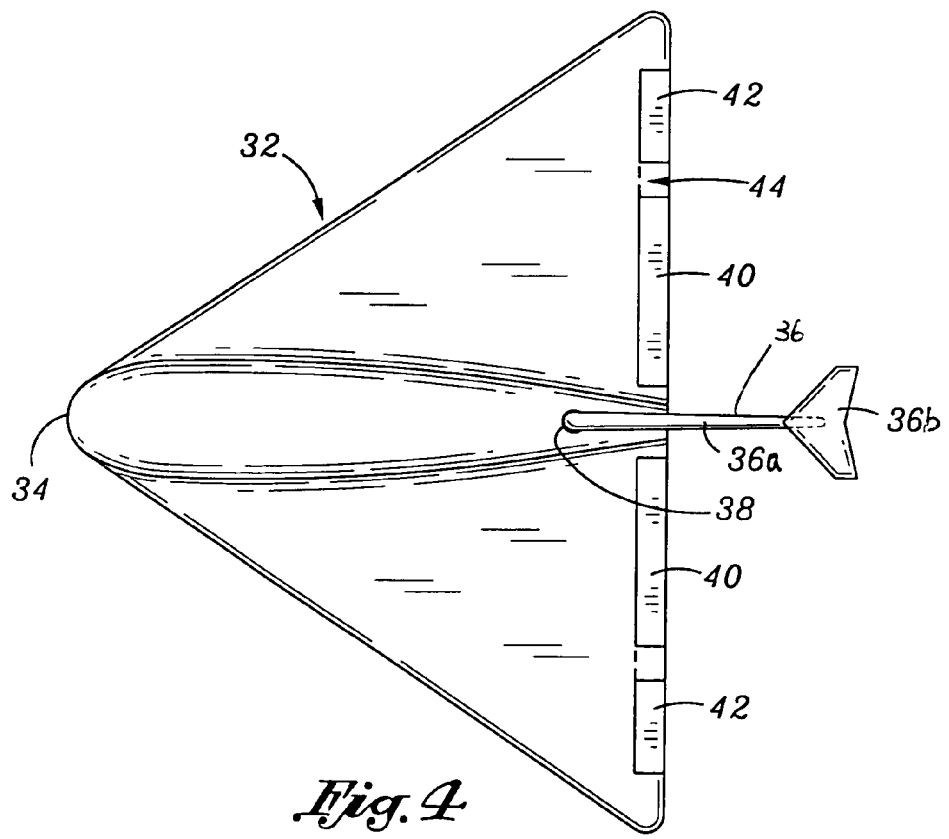
FIG. 4 shows a top view of the all-wing aircraft as shown in FIG. 3.

The present invention provides an aircraft motion control mechanism that allows the aircraft to attain an enhanced lift coefficient while the orientation is regulated, that is, while the aircraft is trimmed, at the same time. FIG. 3 and FIG. 4 show a side view and a top view of an all-wing aircraft 30 provided by the present invention, respectively. An exemplary fuselage of a simple delta wing configuration is illustrated in FIGS. 3 and 4 for the convenience of description. It is appreciated that the aircraft auxiliary control mechanism provided by the present invention can also be applied to the aircraft other than the tailless one as shown in FIGS. 3 and 4. For example, the auxiliary control mechanism can also be applied to the aircraft with the fuselage as shown in FIG. 1.

In FIGS. 3 and 4, the wing has a leading edge 32 swept back from a nose 34. The aircraft 30 includes two pair of deflectable surfaces 40 and 42 functioning as the flaps and the ailerons and/or elevators hinged at the trailing edge 44 of the wing, respectively. In the present invention, the aircraft 30 further comprises an auxiliary control structure 36 such as a tail boom extending over the aircraft 30 from the principal axis thereof. The auxiliary control structure 36 further includes a support arm 36a and an auxiliary flow control surface 36b. One end of the support arm 36a is connected to a pivot 38 at the rear part of the fuselage/wing, while the other end of the support arm 36a is connected to the auxiliary flow control surface 36b remote from the fuselage/wing. Therefore, the support arm 36a can be moved or deflected up or down by controlling the pivot 38. By deflecting the support arm 36a, the auxiliary flow control surface 36b connected to the support arm 36a consequently moves to vertically deflect airflow. Therefore, the auxiliary flow control surface 36b functions as a remote extension of the wing, and as the auxiliary flow control surface 36b is remote from the aircraft 30, more flexibility in sizing is obtained.

Figure 3A:
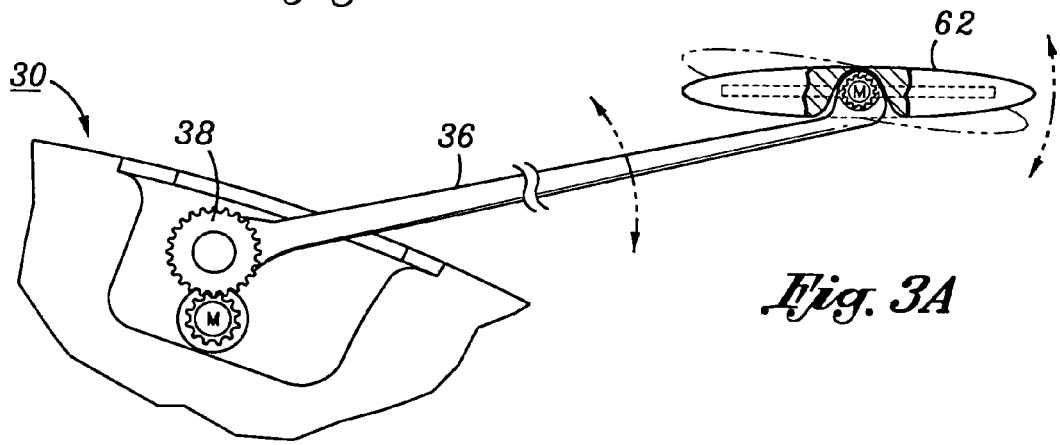
FIG. 3A shows a side view of the structure for regulating movement of the auxiliary control structure.

FIG. 3A shows a close-up perspective view of the auxiliary control structure 36 as shown in FIGS. 3 and 4. As shown in FIG. 3A, one end of the support arm 36 is pivotally connected to the aircraft 30 via a pivot 38. Preferably, the pivot 38 is embedded in the aircraft 30 and sealed by a material 39. Devices for controlling or regulating movements of the support arm 36a and deflection of the auxiliary flow control surface 36b are denoted by 72 and 74, respectively, and will be described in detailed in the following paragraph.

As mentioned above, the deflectable surfaces 40 and 42 can be deflected up or down to decrease or increase lift of the aircraft 30 as required. However, the deflection along the same direction, for example, the pair of the deflectable surfaces 40 or the pair of the deflectable surfaces 42 deflecting up (or down) at the same time, causes a pitch motion of the aircraft 30. To regulate the pitch motion, traditionally, the deflectable surfaces 42 are deflected in pair towards the direction that results in a change of lift in a reverse direction. In this invention, instead of deflecting the deflectable surfaces 42, the auxiliary control structure 36 is pivoted to produce a torque about the center of gravity of the aircraft 30 along a direction opposite to the pitch motion. For example, when more lift is required, both the deflectable surfaces 42 can be deflected down, while the auxiliary control structure 36 is upward pivoted, that is, deflected up, to regulate the pitch motion caused by the downward deflection of the deflectable surfaces 40 and 42. In contrast, when less lift is required, both of the pairs of deflectable surfaces 40 and 42 can be deflected up, while the auxiliary control structure 36 is downward pivoted, that is, deflected down to balance the pitch motion caused by the upward deflection of the deflectable surfaces 40 and 42. The upward and downward deflections of the auxiliary control structure 36 are illustrated as the broken lines in FIG. 3. As a result, the deflectable surfaces 40 and 42 can be controlled to obtain the intended flying parameters of the aircraft 30 without the pitch motion concern.

As known to a person of ordinary skill, action of other elements of the aircraft 30 or external factors such as the weather condition other than actions of any element of the aircraft 30 may also generate motion of the aircraft 30, such as the pitch and roll motions mentioned as above. Regardless of the causing factors, the auxiliary control structure 36 is operative to regulate various kinds of motions of the aircraft 30.

In one embodiment of the present invention, in addition to the consequent deflection caused by the movement of the support arm 36a, the auxiliary flow control surface 36b can be deflected up or down about the support arm 36a. The deflection of the auxiliary flow control surface 36b deflects the airflow; and consequently, provides additional control of the aircraft 30. Device such as the actuator 74 can be installed at the connection between the support arm 36a and the auxiliary flow control surface 36b to regulate the deflection of the auxiliary flow control surface 36b.

Figure 5:
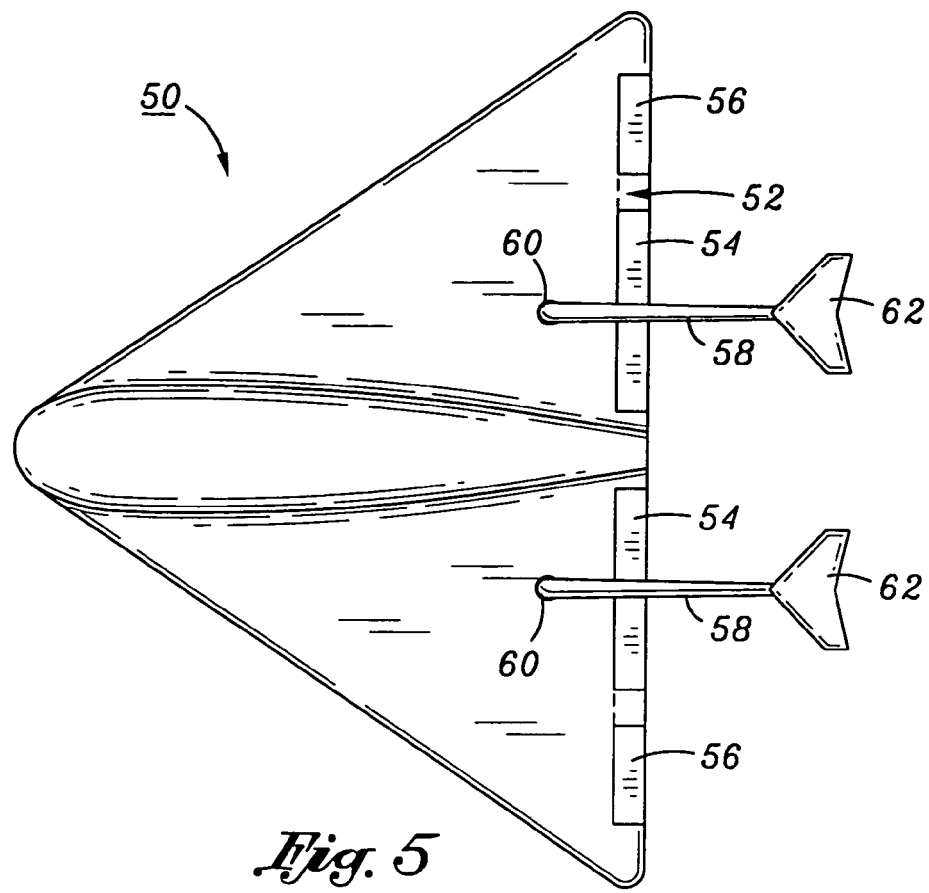
FIG. 5 shows a top view of an all-wing aircraft with two pivotable control structures.

FIGS. 3 and 4 show an aircraft with a single auxiliary control structure 36. Depending on the desired control, the aircraft may include multiple auxiliary control structures. FIG. 5 shows an aircraft with a pair of auxiliary control structures. In FIG. 5, again, to provide a better understanding the present invention, an all-wing aircraft is illustrated. Similarly to the aircraft 30 as shown in FIGS. 3 and 4, the aircraft 50 includes a fuselage in the form of a wing. Deflectable surfaces 54 and 56 (flaps and elevons) are hinged with the trailing edge 52 of the wing. The aircraft 50 further includes a pair of auxiliary control structures 58 connected to and extending from a rear portion of the wing. The auxiliary control structures 58 are preferably symmetrically positioned and have similar structures as the auxiliary control structure 36 as shown in FIGS. 3 and 4. One end of each auxiliary control structure 58 is connected to a pivot 60 embedded in the fuselage/wing of the aircraft 50, while the other end of the auxiliary control structure 58 has an auxiliary flow control surface 62. The geometry of the auxiliary flow control surface 62 can be designed according to the requirement for achieving various objects. For example, the auxiliary flow control surface 62 may be designed with a swept-back plan-form, a dihedral angle or an anhedral angle. The auxiliary flow control surfaces 62 can be designed to deflect about the other end of the support arm of the auxiliary control structure 58.

Similar to the aircraft with a single auxiliary control structure, the auxiliary control structures 58 can be deflected up or down to control the pitch motion of the aircraft 50. For controlling the pitch motion, the auxiliary structures 58 are preferably deflected towards the same direction as a pair. In addition to the pitch motion, roll motion is another consequence for deflecting the deflectable surfaces 54 and 56. In FIG. 5, the pair of deflectable surfaces 56 can be deflected to opposite direction to create forces at two lateral sides of the wing. The oppositely directed forces create a torque about the center of gravity of the aircraft 50 causing the aircraft to bank, and consequently curving the flight path of the aircraft. Accompanied with the banking motion, and a roll motion, that is, the rotation about the principal axis of the aircraft 50 is resulted. The roll motion is typically controlled or regulated by deflecting the ailerons. In the present invention, instead of deflecting the ailerons (the deflectable surfaces 56), the pair of the auxiliary control structures 58 can be pivoted towards different directions, for example, with one auxiliary control structure 58 pivoted upward and the other auxiliary control structure 58 pivoted downward, to control the roll motion. This maintains the optimum wing configuration for efficiency, while maintaining long endurance loitering capability.

Figure 7:
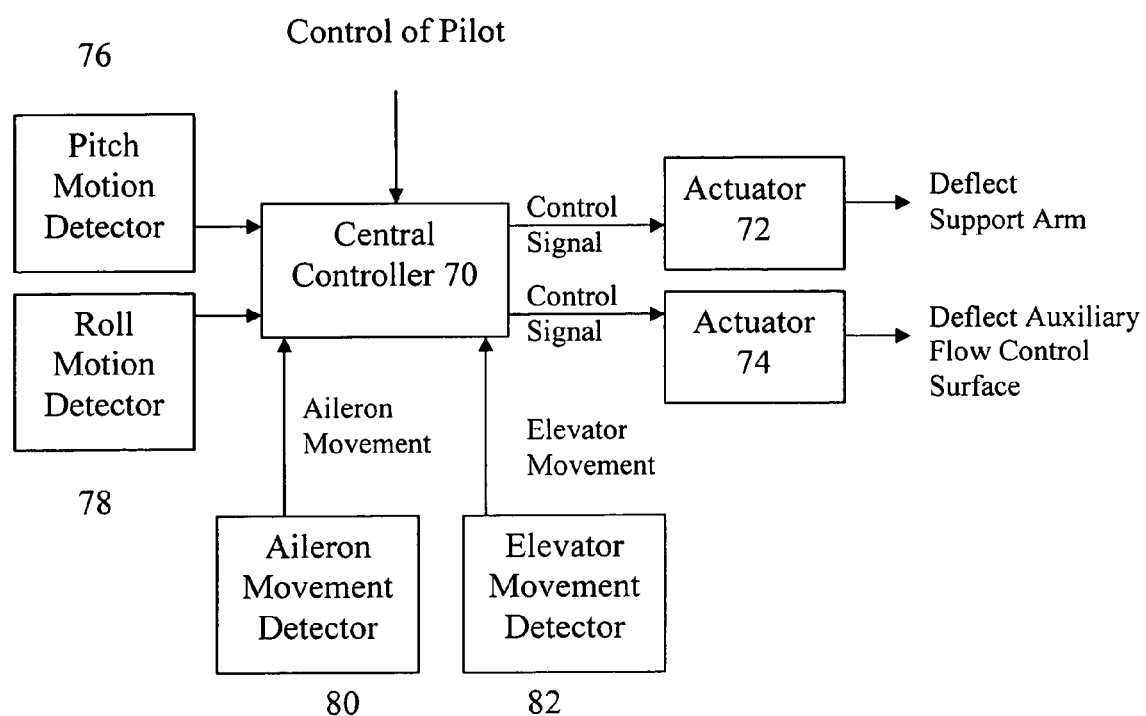
FIG. 7 shows a control system for controlling the auxiliary control structure as shown in FIGS. 3, 4 and 5.

In addition to the auxiliary control structure(s) and the fuselage/wing, the aircraft further comprises a control system for controlling the movement of the auxiliary control structure as shown in FIG. 7. In FIG. 7, the control system comprises a central controller 70, from which a control signal is generated, an actuator 72 to pivot the entire auxiliary control structure by deflecting the support arm thereof in response to the control signal. The control system may further comprise an additional actuator 74 to deflect an auxiliary flow control surface of the auxiliary control structure only. The control signal may be generated by the pilot according to the information of the flight condition. Alternatively, the control signal may be generated based on the current flight condition detected by various detecting devices such as a pitch motion detector 76 or a roll motion detector 78. Such that the roll motion and pitch motion of the aircraft can be automatically controlled. Further, the deflection of the auxiliary control structure, or the deflections of the support arm and the auxiliary control surface of the auxiliary control structure can also be designed in response to the movement or deflection of the deflectable surfaces such as the ailerons and elevators of the aircraft. The movement of the ailerons and elevators can be supplied by devices such as aileron movement detector 80 and elevator movement detector 82.

Figure 2:
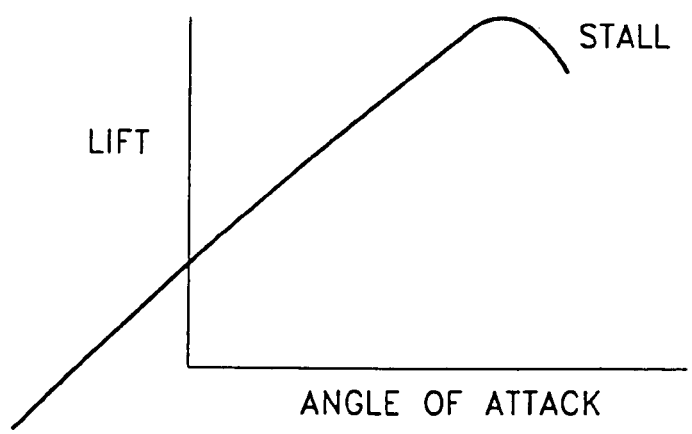
FIG. 2 shows the lift as a function of inclination of the aircraft, that is, the angle of attack.

In addition to the motion regulation, installation of the auxiliary control structure(s) allows center of gravity of the aircraft shifting towards the rear portion thereof. If the center of gravity is located aft of the aerodynamic center, the aircraft will trim at a higher angle of attack with the flaps, ailerons, and/or elevators deflecting downward rather than upward, thereby increasing the camber and allowing the aircraft to achieve a higher lift coefficient. Referring to FIG. 2, when the aircraft is installed with the auxiliary control structure as shown in FIGS. 3–5 provided by the present invention, the linear region of the curve could bias upward as camber of the wing is optimized for cruise. Further, through the mass balancing of the auxiliary control structure, the flutter concern is minimized or eliminated, and the design flexibility of the aircraft is increased.

The all-wing aircrafts in a delta-wing configuration may be designed to have low observability to visual, radar, thermal and acoustic detecting devices. Within aerodynamic requirements, the entire surface of the aircraft is as flat as possible. Under such condition, the auxiliary control structure (36 as shown in FIG. 3A) projecting from the fuselage/wing of the aircraft 30 is preferably made of a non-conductive material that is substantially transparent to radar. Further, the pivot 38 that connects and controls the auxiliary control structure 36 is preferably embedded in the fuselage/wing and sealed by a low reflectivity material 39 deposited in the recess or other areas where pivot 30 is located to reduce radar return.

Figure 6:
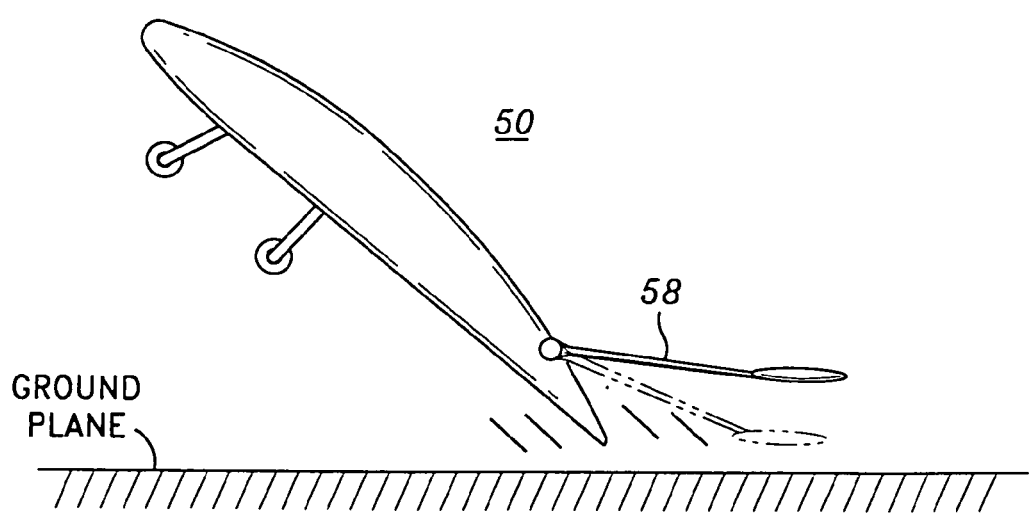
FIG. 6 shows the nominal angle of the auxiliary control surface relative to the control structure set to allow aircraft rotation without striking the tail surface.

Further, tail strike is eliminated during takeoff and landing by designing the auxiliary control surface to be at an angle relative to the control arm. FIG. 6 shows a schematic side view of an aircraft with an auxiliary control structure taking off from a ground plane. When the aircraft is taking off from or landing on the ground plane, the auxiliary control structure can be pivoted through its range motion without the risk of a tail strike. As shown in FIG. 6, when the auxiliary control structure is positioned as indicated by the solid line, the aircraft is in the nominal flight position. When the auxiliary control structure is deflected to a position illustrated by dash line, tail strike is avoided.

The above embodiment uses an all-wing aircraft as an example to provide a better understanding of the present invention. It is appreciated that the present invention is not limited to the all-wing aircraft only. That is, the auxiliary control structure can be pivoted to a part of a fuselage or a wing in all kinds of aircrafts to provide the similar effects as described above.

Indeed, each of the features and embodiments described herein can be used by itself, or in combination with one or more of other features and embodiment. Thus, the invention is not limited by the illustrated embodiment but is to be defined by the following claims when read in the broadest reasonable manner to preserve the validity of the claims.

What is claimed is:

1. An aircraft, comprising:
   a) a body portion;
   b) an auxiliary control structure for regulating aircraft motion, the auxiliary control structure further comprising:
      i) a pair of control arms pivotally connected and extending from the body portion, the pair of control arms being operative to deflect about the body portion in the same direction or in opposing directions; and
      ii) a pair of auxiliary flow control surfaces, each connected to one of the support arms and operative to deflect airflow to regulate orientation of the aircraft from a location remote from the body portion.

2. The aircraft as recited in claim 1, wherein the body portion comprises a fuselage.

3. The aircraft as recited in claim 1, wherein the body portion comprises a wing.

4. The aircraft as recited in claim 1, wherein the auxiliary flow control surfaces are deflectable about the support arms.

5. The aircraft as recited in claim 1, wherein the support arms and the auxiliary flow control surfaces are made of electromagnetic absorbent material.

6. The aircraft as recited in claim 5, wherein the body portion further comprises a sealing material made of electromagnetic absorbent material.

7. The aircraft as recited in claim 1, wherein the control arms are operative to deflect about the body portion independently to each other.

8. The aircraft as recited in claim 1, wherein the control arms are operative to deflect about the body portion simultaneously.

* * * * *